(12) United States Patent
Hopkins

(10) Patent No.: X8424
(45) Date of Patent: Sep. 30, 1834

(54) COOKING STOVE

(76) Inventor: William A. Hopkins

Letters Patent.
William A. Hopkins.

The Schedule referred to in these Letters Patent and
making part of the same, containing a description in the
words of the said William A. Hopkins, himself of his improvement
in Cooking Stoves.

---

To all whom these Presents shall come:
Be it Known that I, William A. Hopkins of the City County
and State of New York have invented new & useful improvements
in Cooking Stoves for the burning and use of Anthracite coal and
that the following is a full and exact description of the construc-
tion and operation of the said Machine as invented by me.
Firstly. - a sliding or movable grate resting on cleats in
each cheek of the Stove (which is of the Franklin shape) that can
be moved forwards and backwards. The grate constructed with
with bars in the rear corresponding with those in front, inclining
a little outwardly from bottom to top, or made upright like the
bars in front (the principle being the same) so as to create an upright
narrow draught or flue running up parallel with the rear bars
of the grate and the back plate of the Stove the same flue being
enlarged if necessary by drawing the grate forth. The most powerful
draught of air being produced all around and through the grate
when the grate is so placed as that the doors which open in
front of it may be closed, thereby creating a rapid uniform and
constant ignition of the coal, and at the same time economising
the fuel as the quantity may be limited according to the re-
quired degree of heat.
Secondly - an oval oven which receives the heat
and smoke (from the horizontal flue leading from the stove)
immediately at the centre of the underside, into the bottom
flue of the oven, which flue is nearly the length of the oven
dividing the heat and smoke equally, and running up on
both sides of the oven, with no angles or corners to obstruct
or lessen the strength of the draught - thence passing off [illegible]

the top of the oven in two separate flues with branch pipes to terminate in one: thereby furnishing an uniform heat throughout the oven, not attainable in any other fashioned Cooking Stove Oven. The form and construction of the Grate and Oven are such, that a bright, brilliant and durable heat is produced affording the facilities to roast, to boil and to bake at one and the same time.

Witnesses Wm Ironside } William A. Hopkins
Robt. P. Adams }

( Patented 30th. Sept. 1834 )

420 words